US010464760B2

(12) United States Patent
Herfert (10) Patent No.: US 10,464,760 B2
(45) Date of Patent: Nov. 5, 2019

(54) METHOD AND DEVICE FOR TURNING LARGE-AREA PANELS IN EXTREME OVERSIZE

(71) Applicant: Grenzebach Maschinenbau GmbH, Asbach-Baeumenheim (DE)

(72) Inventor: Christian Herfert, Langweid (DE)

(73) Assignee: Grenzebach Maschinebau GmbH, Asbah-Baeumenheim (DE)

( * ) Notice: Subject to any disclaimer, the term of this patent is extended or adjusted under 35 U.S.C. 154(b) by 215 days.

(21) Appl. No.: 14/434,067

(22) PCT Filed: Sep. 26, 2013

(86) PCT No.: PCT/DE2013/000550
§ 371 (c)(1),
(2) Date: Apr. 7, 2015

(87) PCT Pub. No.: WO2014/056470
PCT Pub. Date: Apr. 17, 2014

(65) Prior Publication Data
US 2015/0259159 A1 Sep. 17, 2015

(30) Foreign Application Priority Data
Oct. 9, 2012 (DE) .................. 10 2012 019 841

(51) Int. Cl.
B65G 49/06 (2006.01)
B65G 47/91 (2006.01)
B65G 47/92 (2006.01)

(52) U.S. Cl.
CPC ........... *B65G 49/067* (2013.01); *B65G 47/91* (2013.01); *B65G 47/92* (2013.01); *B65G 49/068* (2013.01);
(Continued)

(58) Field of Classification Search
CPC ...... B65G 47/91; B65G 47/92; B65G 49/048; B65G 47/015; B65G 2201/022; B65G 2249/045; B65G 49/067
(Continued)

(56) References Cited

U.S. PATENT DOCUMENTS 3,541,597 A 11/1970 Segawa et al.
RE28,609 E * 11/1975 Malburet ............. B65G 49/068
414/736
(Continued)

FOREIGN PATENT DOCUMENTS

CN 101085522 A 12/2007
CN 102105375 A 6/2011
(Continued)

OTHER PUBLICATIONS

Office action dated Dec. 28, 2015 in corresponding CN App. No. 201380052921.6.
(Continued)

*Primary Examiner* — Lynn E Schwenning
(74) *Attorney, Agent, or Firm* — Walter | Haverfield LLP; Sean F. Mellino; D. Peter Hochberg (57) ABSTRACT

The invention relates to a method and device for turning large-area panels, in particular glass panels, in extreme oversize of the order of magnitude of more than 40 meters in length and over 6 meters in width, wherein pick-up from the bath side or from the air side is possible, the method comprising the following features: a) the glass panels (2) delivered on conveyor rollers of a transport device (3) are gripped by means of a plurality of stacking robots (1) that extend for the entire length of the glass panel (2) and are installed on respective robot base frames (19) on the air side or on the bath side by means of pivotable suction frames (6) and suction cups (5) fastened thereto, b) the glass panel (2)
(Continued)

gripped in this manner is pivoted jointly by the plurality of stacking robots and set down on a stacking shelf (4).

9 Claims, 7 Drawing Sheets

(52) U.S. Cl.
CPC ...... *B65G 47/915* (2013.01); *B65G 2201/022* (2013.01); *B65G 2249/045* (2013.01)

(58) Field of Classification Search
USPC .................................................. 414/798.5
See application file for complete search history.

(56) References Cited

U.S. PATENT DOCUMENTS

| | | | |
|---|---|---|---|
| 4,228,886 A * | 10/1980 | Moran ................ | G01B 11/002 198/395 |
| 4,417,150 A * | 11/1983 | Moran ................ | G01B 11/245 250/559.24 |
| 4,976,584 A * | 12/1990 | Focke ................ | B65G 61/00 414/789.6 |
| 6,659,265 B2 | 12/2003 | Pfeilschifter et al. | |
| 7,075,772 B2 | 6/2006 | Heiland | |
| 7,552,815 B2 * | 6/2009 | Pahud ................ | B65G 21/2036 198/394 |
| 8,037,995 B2 | 1/2011 | Willi et al. | |
| 8,108,148 B2 * | 1/2012 | James ................ | G01S 17/89 180/167 |
| 8,550,765 B2 | 10/2013 | Cottone et al. | |
| 8,712,679 B1 * | 4/2014 | Mostofi ............... | G09B 29/00 340/552 |
| 8,788,086 B2 * | 7/2014 | Franz ................ | B65G 49/061 700/218 |
| 9,190,554 B2 * | 11/2015 | Schmid .............. | H01L 21/6715 |
| 2003/0062245 A1 | 4/2003 | Pfeilschifter et al. | |
| 2004/0060172 A1 | 4/2004 | Heiland | |
| 2004/0240981 A1 | 12/2004 | Dothan et al. | |
| 2006/0099064 A1 | 5/2006 | Anaki et al. | |
| 2006/0289275 A1 * | 12/2006 | Lemke ................ | B65G 13/12 198/460.2 |
| 2010/0106288 A1 * | 4/2010 | Strass ................ | B65G 49/061 700/218 |
| 2010/0232923 A1 * | 9/2010 | Dorner ................ | B21D 43/003 414/776 |
| 2011/0005903 A1 * | 1/2011 | Niewiera ............. | B65G 49/064 198/791 |
| 2011/0247914 A1 | 10/2011 | Weigl | |
| 2011/0276174 A1 * | 11/2011 | Bolzani ............... | B65G 47/086 700/217 |
| 2012/0119528 A1 * | 5/2012 | Herfert ............... | B65G 47/91 294/65 |
| 2012/0207575 A1 * | 8/2012 | Masoero .............. | B25J 9/046 414/751.1 |
| 2012/0274011 A1 * | 11/2012 | Schilp ................ | B65G 47/911 269/21 |
| 2012/0330453 A1 * | 12/2012 | Samak Sangari ...... | B25J 9/1697 700/121 |

FOREIGN PATENT DOCUMENTS

| | | | | |
|---|---|---|---|---|
| DE | 1918791 U | | 7/1965 | |
| DE | 19712368 A1 | | 10/1998 | |
| DE | 10148038 A1 | | 4/2003 | |
| DE | 10232080 A1 | | 2/2004 | |
| DE | 20 2007 003907 U1 | | 5/2007 | |
| DE | 102005060452 A1 | | 6/2007 | |
| DE | 102007035743 A1 | | 2/2009 | |
| DE | 10 2008 058 403 A1 | | 5/2010 | |
| DE | 102009025500 B3 | | 3/2011 | |
| DE | 20 2011 1088 36 | * | 2/2012 | ............ H01L 31/18 |
| JP | 2010030744 A | | 2/2010 | |
| WO | WO 2009/094995 | * | 8/2009 | ............ B65G 49/06 |
| WO | WO 2013/083111 | * | 6/2013 | ......... H01L 31/0232 |

OTHER PUBLICATIONS

Chinese Office Action dated Dec. 14, 2016 for corresponding Chinese Application No. 201380052921.6.

Communication pursuant to Article 94(3) from the European Patent Office dated Jun. 1, 2016 for corresponding European Patent Application No. 13786618.2.

* cited by examiner

METHOD AND DEVICE FOR TURNING LARGE-AREA PANELS IN EXTREME OVERSIZE

CROSS-REFERENCE TO RELATED APPLICATION

This application is a U.S. national phase of International Application No. PCT/DE2013/000550, filed on Sep. 26, 2013, which claims priority of German patent application number 10 2012 019 841.8, filed on Oct. 9, 2012, both of which are incorporated herein by reference in their entireties.

BACKGROUND OF THE INVENTION

Field of the Invention

The invention relates to the repositioning of panels, in particular glass panels, of large surface area and of extreme size. In this document, "extreme size" is understood to mean dimensions of greater than 40 meters in length and greater than 6 meters in width. Said panels are preferably glass panels.

Glass panels of large surface area are produced in the form of float glass by continuously pouring molten glass onto a tin bath which is heated in an elongate tub, and a resulting glass ribbon being reproduced thereby. This glass ribbon has one side which lays on the tin bath, the so-called bath side. The other side of the glass ribbon, which side was cooled in the air, is designated the so-called air side. The bath side and the air side have different properties. Since the air side has fewer uneven areas for example, it is more suited to being coated. The float glass is then finished by making longitudinal cuts and cross-cuts in the glass ribbon which is produced in the float glass production process at a defined feed rate. Here, the longitudinal cuts are made by longitudinal cutting wheels which are installed in stationary fashion in an appropriate position above the glass ribbon, and the cross-cuts are made with the aid of cutting bridges and cross-cutting wheels which move transversely over the glass ribbon on said cutting bridges. Glass panels of considerable size can be produced in this way. A size of 6 meters by 3.21 meters is designated a so-called ribbon size or large format here. A panel size of 3.21 meters by 2 meters (up to 2.5 meters) is designated a so-called split ribbon size or medium format.

In order to transport glass panels of such a size from one site to another without said glass panels breaking, holding mechanisms, usually in the form of a sturdy frame, are moved toward the relevant glass panel for this purpose, connected thereto by means of suction cups, and then the holding mechanism to which the glass panel is attached by suction is conveyed further.

Description of the Prior Art

Prior art document DE 197 12 368 A1 discloses a method for moving objects from a first location to a second location using a holding mechanism which binds the object to it during the movement process, the objective intended to be achieved by said method being that of developing said method in such a way that objects can be securely moved under all circumstances in a simple manner. The objects to be moved are glass panels in this case.

Said objective is achieved, according to the specification as set forth below and in the appended claims, wherein a lifting mechanism is moved toward the object to be moved to the first or the second location taking into account the actual position and/or orientation thereof, wherein the holding mechanism is oriented, as required, by utilizing an ability of said holding mechanism to rotate freely and/or pivot freely about one or more axes.

According to an aspect of the present invention, an object to be moved is a glass pane, where the first location is an internal loader rack, and that the second location is a conveyor belt and holding mechanism is a suction frame.

DE 101 48 038 A1 describes a device for transferring panels from a panel conveyor to a stacking framework or the like, having a robot with a robot arm which has, at its free end, a suction frame or the like for receiving a panel from the panel conveyor, and which is provided with a number of degrees of freedom that is adequate for its movement function.

The objective of developing a device of this kind is to form a device for transferring panels from a panel conveyor to a stacking framework such that, in the case of a glass panel, the air side of the glass is adversely affected as little as possible.

Said objective is achieved in that the panel conveyor is provided with a cutout into which the robot arm is able to enter, and with cutouts which also allow the suction frame or the like to enter. Furthermore, the suction frame or the like is intended to be arranged at the free end of the robot arm such that it can be pivoted into an upwardly pointing position in order to take hold of a panel on its side which faces the panel conveyor from the position entering the cutouts in the panel conveyor.

The stacking framework used here is fastened to the floor such that it cannot move, and consequently it can be loaded only from that side which faces the robot arm. In addition, the stacking framework, each time it is loaded with a further glass panel, has to be moved away from the robot arm by the small distance of the thickness of a glass panel since the distance of the robot arm has a fixed value. To this end, so-called carriages are necessary in practice in the case of the current prior art, said carriages moving the stacking framework away from the robot arm by the distance of one glass panel thickness in each case prior to said stacking framework being loaded with a new glass panel, in order to make space for a further glass panel. Furthermore, a turntable is required for the purpose of loading the stacking framework from the other side. In order to load the stacking framework with large and heavy glass panels, the carriages required and the turntable necessary to bear the resulting load are of complicated construction and are very expensive to produce.

The prior art has further disclosed, without documentary evidence being provided, that glass panels of up to 16 meters in length and 4 meters in width have been handled with components of very extreme dimensions. However, the limits of normal technology are reached at these dimensions.

BRIEF SUMMARY OF THE INVENTION

The apparatus according to the invention and the corresponding method are therefore based on the objective of, in a normal state, capturing very large glass panels of extremely large dimensions, that is to say of greater than 40 meters in length and greater than 6 meters in width, from the production line in an extremely short period of time, picking up said glass panels such that they do not vibrate and stacking said glass panels in a secure manner. Since a panel of this kind also has to be coated and a coating of this kind is usually applied to the smoother side, specifically the air side, it is necessary for it to be possible to capture said panel from the opposite side, specifically the bath side, too.

This objective is achieved by a battery of stacking robots as set forth in the claims.

BRIEF DESCRIPTION OF THE DRAWINGS

The invention will be described in greater detail below with reference to figures, specifically in which.

DETAILED DESCRIPTION OF THE INVENTION

Figure 1:
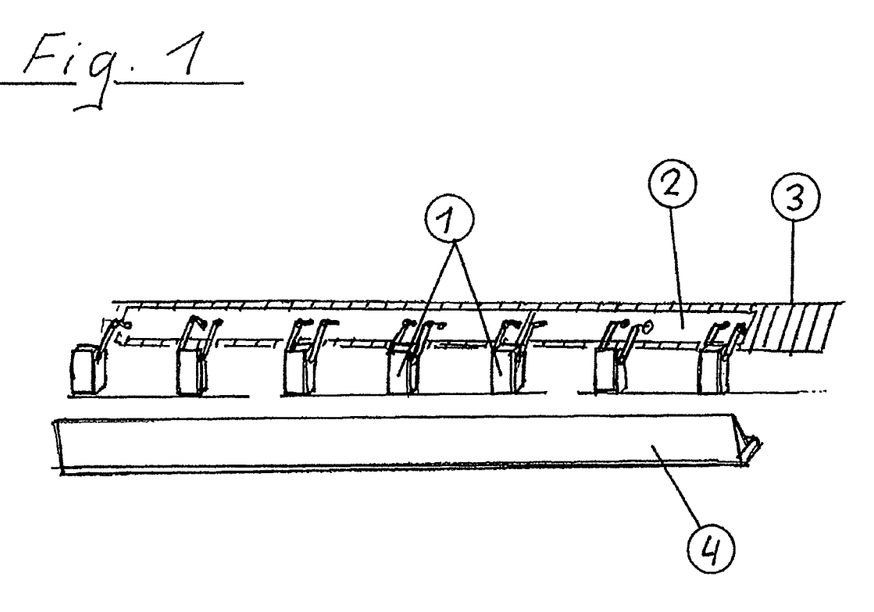
FIG. 1 shows a perspective illustration of one part of the entire apparatus.

FIG. 1 shows a perspective illustration of one part of the entire apparatus according to the invention. Since the apparatus according to the invention involves conveying glass panels of extreme size, specifically of the order of greater than 40 meters in length and greater than 6 meters in width, it is clear that the entire conveying system cannot be illustrated in its entire length in FIG. 1. This does not appear to be necessary either since the structure of the conveying means does not change over the entire length of the system.

A system for conveying a glass panel of this size appears to be one of a kind. Therefore, there are obviously no models for solving the objective presented here either.

FIG. 1 shows how a battery of stacking robots 1 which are arranged next to one another lifts a glass panel 2 from a transportation apparatus 3. Only seven stacking robots 1 are illustrated in said figure by way of example. In this case, the transportation apparatus 3 can be considered to be, by way of example, a customarily used, but modified, roller conveyor, such as is used to further convey a glass ribbon from the melting furnace.

It goes without saying that the number of stacking robots 1 required increases as the length of the glass panel 2 which is to be conveyed increases, wherein the total weight of a glass panel 2 is distributed between the stacking robots 1 available. It goes without saying that the weight of a glass panel 2 which is to be conveyed additionally also increases as the width of said glass panel increases. This of course also has an effect on the concentration of the stacking robots 1 which are arranged next to one another, that is to say likewise has an effect on the number of said stacking robots.

The front portion of the perspective illustration in FIG. 1 shows one part of a stacking shelf 4 which extends over the entire length of a glass panel 2 and serves as a temporary holding bearing after a glass panel 2 has been repositioned.

Figure 2:
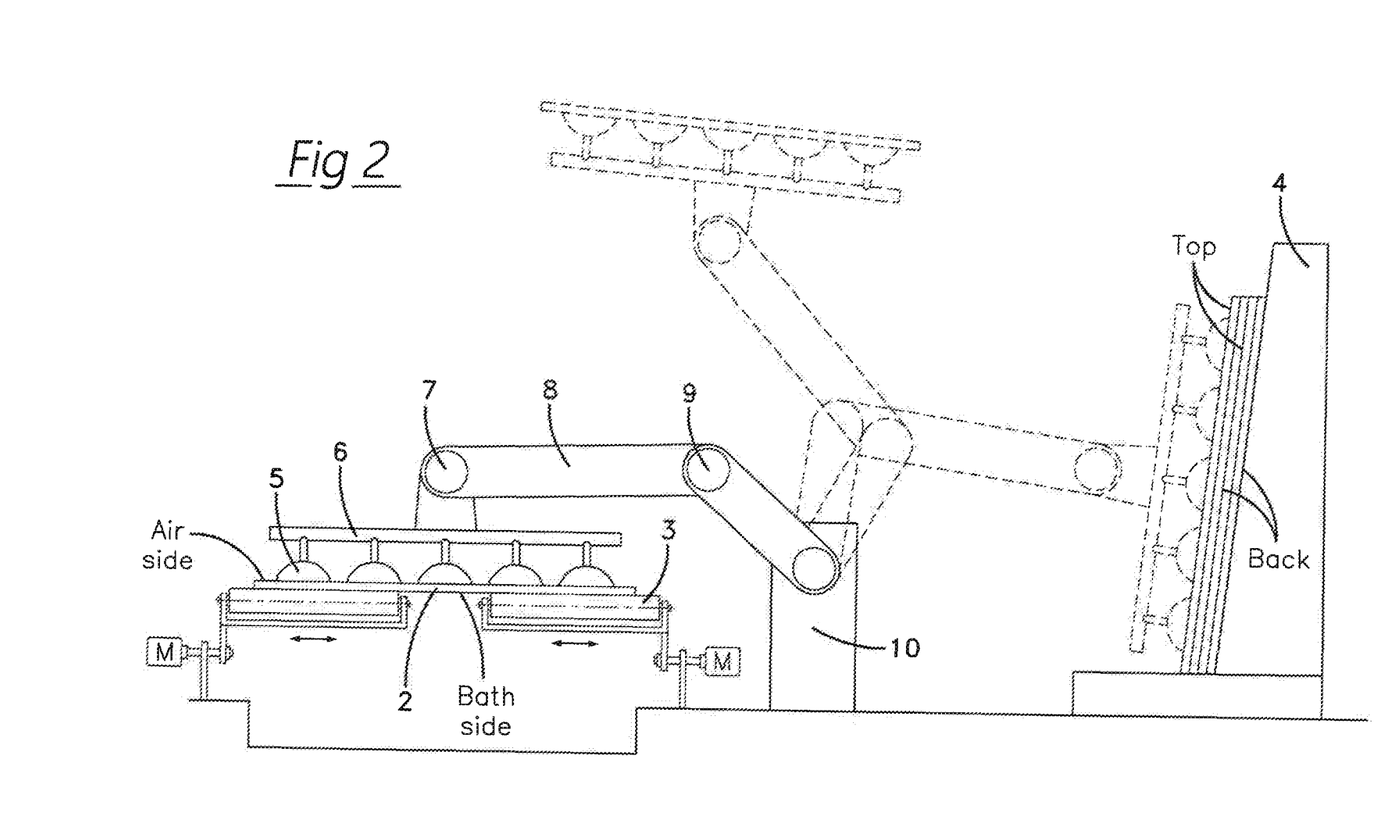
FIG. 2 shows a sectional drawing through the entire apparatus.

FIG. 2 illustrates a sectional drawing through the entire apparatus.

One part of a robot basic frame 10, which is fitted with a robot arm 8, is shown as a central rotary bearing in the center of FIG. 2. The robot arm 8 is connected in an articulated manner to the basic frame 10 such that it can rotate by means of a rotary joint 9 with a synchronous drive and by means of a main arm 12 at one end, and is fitted with a pivot head 7 at the other end.

Figure 4:
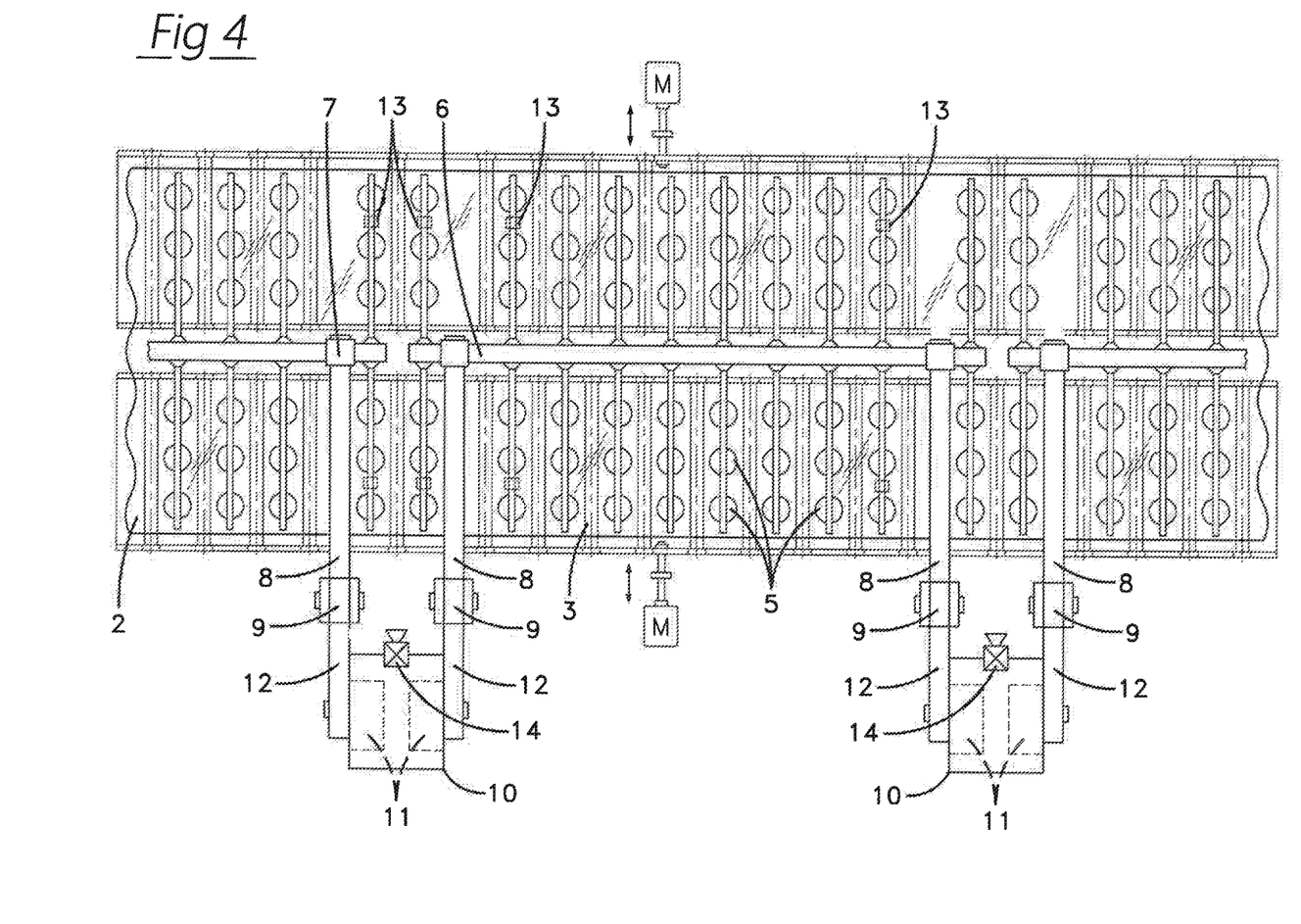
FIG. 4 shows a detailed drawing of the entire apparatus.

The pivot head 7 is fitted with a suction device frame 6 which, in turn, is equipped with a number of suction devices 5. Reference is made to FIG. 4 for a more detailed explanation of the arrangement of the suction devices 5. The five suction devices 5, which are shown by way of example and are illustrated in a stylistic manner in this figure, are connected to the glass panel 2 which itself lies on the transportation apparatus 3. The transportation apparatus 3 comprises two roller conveyors which run at a distance and in parallel.

The part of FIG. 2 which is drawn using dashed lines shows two stations of the movement sequence of a robot arm 8 carrying a glass panel 2. In the upper position of the robot arm 8, the glass panel 2 is lifted, as it were, "overhead" by the transportation apparatus 3 from the air side, and the glass panel 2 is set down directly onto the stacking shelf 4 as the fourth glass panel in the right hand-side position.

The use of a stacking robot 1 in this location further has the critical advantage that the stacking shelf 4 does not have to be displaced by the thickness of one glass panel 2 when a further glass panel 2 is set down since this change in distance can already be taken into account by the control system of the robot arm 8. If the stacking shelf in each case has to be displaced by the distance which makes up the thickness of one glass panel 2, this would require very costly measures since it would firstly be necessary in this case to use components which have to be of very stable design and secondly are able to move with a high degree of precision.

Figure 3:
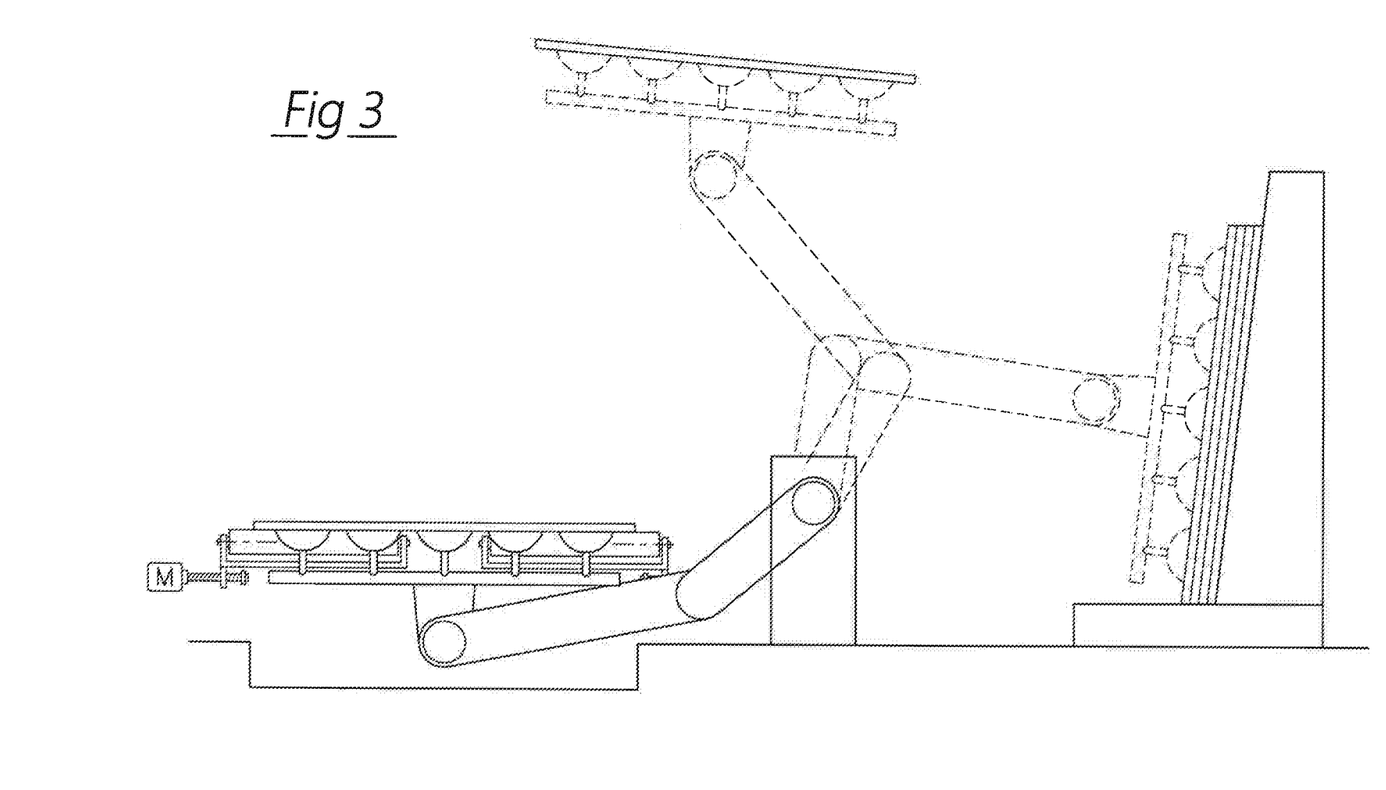
FIG. 3 shows a further sectional drawing through the entire apparatus.

FIG. 3 shows a further sectional drawing through the entire apparatus.

FIG. 3 illustrates how a stacking robot takes hold of a glass panel from the bottom side, that is to say the bath side, and sets down the glass panel, this time with the air side at the top, on a stacking shelf through corresponding gaps in the transportation apparatus. It should of course be noted in this case that the stacking robots 1 are pivoted underneath the transportation apparatus 3 before the glass panel which is to be repositioned enters. FIG. 2 and FIG. 4 also show that the transportation apparatus 3 comprises roller conveyors which run in parallel and at a distance next to one another. In order to ensure that the stacking robots 1 pass through the transportation apparatus 3 safely and to be able to match the position of the stacking robots to particular formats of glass panels 2, the individual rollers are designed such that the position of said individual rollers can be shifted horizontally by means of particular actuating motors, which are not separately identified. This ability to vary the position of the individual rollers of the transportation apparatus 3 is also advantageous for the special case described in the text which follows.

Since it may be necessary to compress the battery of required stacking robots, that is to say to place a relatively high number of stacking robots 1 next to one another, for the purpose of repositioning particularly heavy glass panels 1, provision is made in a particular embodiment to be able to vary the distances between the stacking robots 1 used and to break the connection of the suction device frames 6 between one another and to assign a suction frame 6 to each stacking robot on the left-hand and the right-hand side in each case. The laser sensors 13, which are described in FIG. 4, are of particular importance in this case. This is because the suction frames 6 can additionally be coordinated with one another with the aid of said laser sensors 13 such that they could act virtually in the manner with a rigid connection.

In a further particular embodiment, the suction device frames 6 which are in each case associated with a stacking robot on the left-hand side and on the right-hand side are designed such that the end pieces thereof are of variable length. The respective transverse webs, also see the description relating to FIG. 4 in this respect, can be extended. Therefore, the suction device frame 6 can be matched to the variable distances of the robot basic frames 10.

FIG. 4 shows a detailed drawing of the entire apparatus.

Said figure shows the glass panel 2 from above, which is situated on the rollers of a transportation apparatus 3, which is divided over its length, as a rectangle which is broken at the two transverse sides. The basic frame 10 which is described in FIG. 2 and the two main drives 11 of said basic frame are shown from above in twin design here. Said basic frames are fitted with a robot arm 8 on each of their two sides, wherein, in the illustrated example, the four robot arms 8, which are moved by the two shown robot basic frames 10 by means of the respective main arms 12 and the associated rotary joints 9, are mechanically connected to one another at the relevant pivot heads 7 by means of suction device frames 6. These suction device frames 6 are fitted with transverse webs which are arranged in a comb-like manner and which in turn are fitted with the suction devices 5. Four of said transverse webs each have, by way of example in the end regions thereof, laser sensors 13, only those laser sensors in the upper region of FIG. 4 being provided with reference symbols for reasons of clarity.

These laser sensors 13 are able to emit laser beams for the purpose of communication with the respectively adjacent suction frames 6, but also to receive laser beams of this kind as communication signals. Said laser sensors can therefore coordinate the control of the drives 11 of a robot basic frame 10. Central control is possible in this way for aligning all suction device frames 6, which are required for conveying the respective glass panel 2, in a straight line horizontally and vertically. Since adjacent laser sensors 13 of this kind can also communicate diagonally, it is possible in this way to detect twisting of individual suction device frames 6 and to correct this using control means.

The plane of all of the respectively used suction device frames 6 which is defined using control means in this way forms the output basis for determining the distances between the individual suction devices, called adhesion elements in this location, or electrostatic grippers from the glass panel 2. Since each of the adhesion elements in question has a different pressure behavior or damping behavior during the adhesion process, a relatively constant contact pressure can be achieved in this way by means of the buildup of an individual suction pressure, or adhesion pressure, at least in groups, over the entire surface of a glass panel 2. Additional distance sensors which are oriented in groups are provided for this purpose, said distance sensors not being additionally depicted and also not being provided with reference symbols for reasons of clarity. It goes without saying that a sensor of this type could, in principle, be associated with each individual adhesion element, but there are fewer technical limits than economical limits when handling a glass panel 2 of such a size owing to the resulting volume of data.

In respect of the light field sensors 14 used, which light field sensors are each depicted between two robot arms 8, reference is made to the recent development of so-called mini lenses which, in the form of hundreds of mini lenses, collect optical information in accordance with the optical field principle, it then being possible for said optical information to later be combined using data technology to form images with a desired resolution and/or a desired viewing angle. Mini lenses of this kind are compatible with 3-D images, are cheap to produce and follow the insect-eye principle. Said mini lenses are also able to contribute to superordinate data-related coordination of the adhesion elements involved over the entire region of the glass panel 2.

Figure 5:
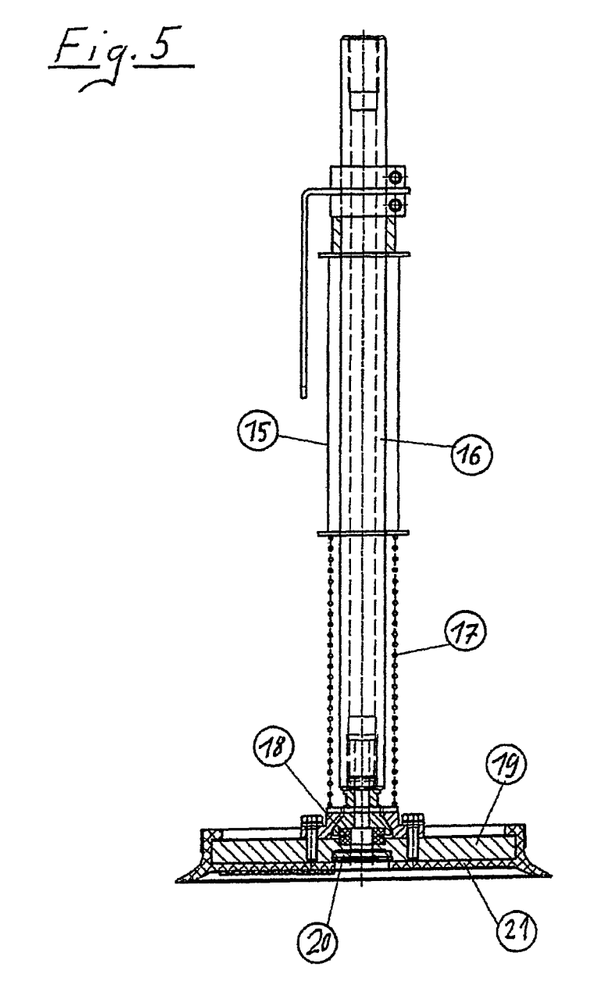
FIG. 5 shows a section through a power suction device.

FIG. 5 illustrates a section through a power suction device 26.

This type of suction device substantially comprises a suction device shank 16, which plugs into a guiding and holding tube 15, and a suction plate 19 which is fastened to said guiding and holding tube. A compensation spring 17, which is mounted between the guiding and holding tube 15 and the suction plate 19, firstly ensures that the suction plate 19 is placed gently onto the glass panel 2 and secondly supports the flexible suction plate holder 18 in the event of inclined positioning. This suction plate holder 18 is produced from a soft but highly shock-absorbing material and forms a harmonious connection between the suction device shank 16 and the suction plate 19. The circular suction device sleeve 21, by way of its particularly adhesive edge lip, establishes the actual connection to the glass panel 2. The suction plate 19 has, in its center, a circular filter element 20. Said filter element serves the purpose of keeping fine glass particles away from the vacuum pump, not identified in any detail here, which is required for operation. Said filter element can either be cleaned manually or replaced at certain intervals. The flow resistance of the filter element 20 of each suction device 26 can be detected in a particular stage of development by a sensor, not additionally shown, and displayed on a monitor.

Provision can further be made for individual suction devices to be able to be individually switched off and/or to be subjected to the action of an adjustable vacuum.

Figure 6:
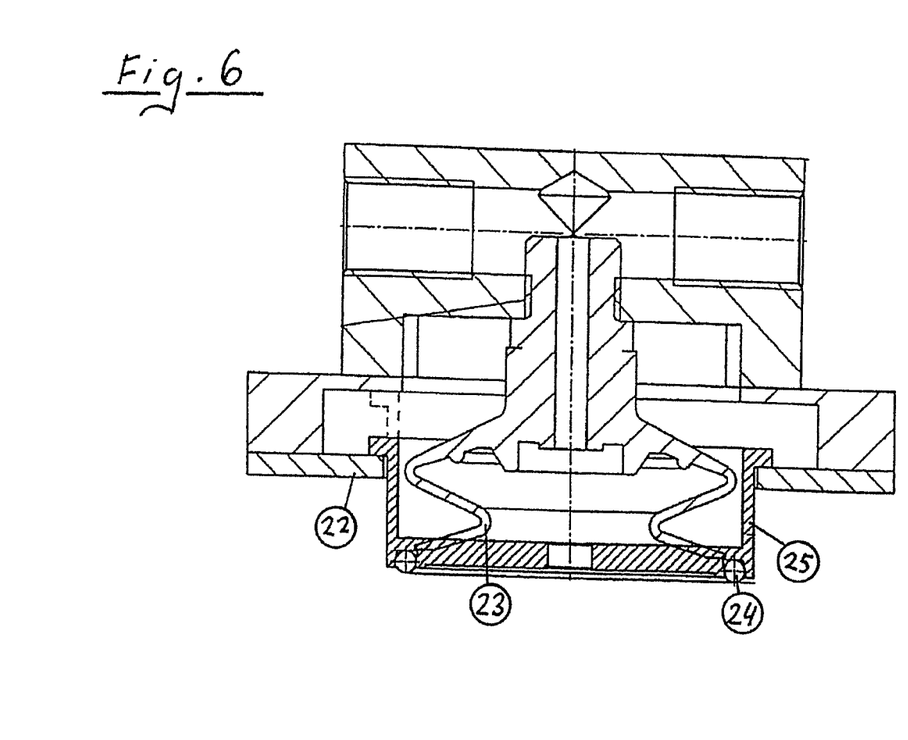
FIG. 6 shows a section through a precision suction device.

FIG. 6 shows a section through a precision suction device 27.

The special effect of this suction device is shown in this illustration. Since it is important for the panes which are to be picked up to be transported and fitted in an absolutely flat position, it is also necessary, in the case of each suction device head, for the surface of the respective suction device head which makes contact with the respective pane to be absolutely flat. This is achieved in the illustration shown by a sealing ring 24 being guided in a suction device head 25 which is composed of solid material. In this case, the suction device head 25 slides together with a rubber bellows 23 in a holding plate 22. Undulating bending of the held pane at the locations of the contact points of the respective suction devices, as is feared with flexible sealing lips in other embodiments of the prior art, is precluded in this case. Here, the suction device head 25 can, for example, also be approximately square or have any desired flat shape which induces as little mechanical stress as possible in the respectively held pane. Therefore, it is possible in this connection, for example, for an elliptical surface to contribute to reducing the stresses in the respective pane as it is picked up and transported.

Figure 7:
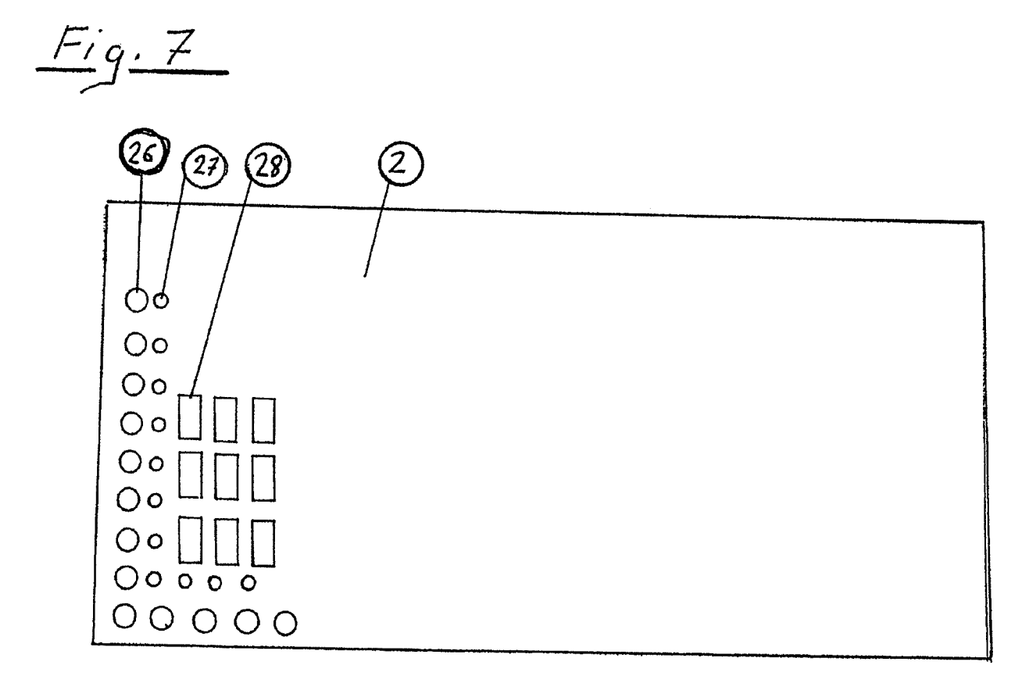
FIG. 7 shows a distribution diagram of gripping elements.

FIG. 7 outlines a distribution diagram of gripping elements.

Up until this point, the structure and the function of the suction frame 6 have been discussed, with suction devices 5 merely being mentioned, to a certain degree as sole function supports. FIG. 7 explains in greater detail that it is necessary to fit the comb-type grippers used with different types of suction devices 5 for the purpose of conveying and protecting a glass panel 2 of such a huge size.

Therefore, by way of example, said figure illustrates that, in the edge region, preferably so-called power suction devices 26, in addition to so-called precision suction devices 27, which serve more for exact fixing, are used on a stylized glass panel 2.

Since it is important for the purpose of subsequent coating of a glass panel 2 on the air side that there are no imprints of suction device rings in the middle, so-called electrostatic grippers 28 or ultrasonic grippers are preferably used in this region. Electrostatic grippers of this kind are known from the prior art and can transmit forces of up to 20 N/cm² transversely to the workpiece surface (ref. no.: 1981 RWTH Aachen). Ultrasonic grippers are also known from the prior art.

The stacking robots can also be used individually, in particular in rapid modes of operation by direct pivoting-through in the air mode.

Control of the complex movement processes and signal processing of the sensors used require a special control program.

The invention has been described in detail with particular emphasis on the preferred embodiment, but variations and modifications within the spirit and scope of the invention are known to those skilled in the art to which it pertains and from the appended claims.

The invention claimed is:

1. An apparatus for repositioning glass panels of large surface area and, wherein said panels can be held from the bath side or from the air side, the apparatus comprising:
   a transportation apparatus comprising conveying rollers, wherein the conveying rollers run in two tracks which run in parallel and at a distance from each other, the conveying rollers are driven individually, and wherein the horizontal distance of the individual conveying rollers in relation to one another can be varied;
   a plurality of stacking robots arranged next to one another, wherein each stacking robot has two pivotable main arms, each main arm having a rotary joint connected in an articulated manner and having a synchronous drive, a robot arm connected to said rotary joint in an articulated manner and connected to a pivot head, and a suction device frame fastened to said robot arm, the stacking robots being installed on robot basic frames;
   a plurality of suction devices supported on the suction device frames by transverse webs arranged in a structure resembling a rake; and
   a stacking framework on which a glass panel can be set down with the air side at the top or with the bath side at the top,
   wherein the suction device frames are fitted with laser sensors for coordinating the position of adjacent suction device frames, each of the robot basic frames having light field sensors for coordinating the position of the entire glass panel,
   wherein the laser sensors communicate diagonally to detect twisting of individual section suction device frames to correct twisting using control means,
   and wherein each individual suction device includes a sealing ring guided in a suction device head, the suction device head sliding together in a rubber bellows in a holding plate, wherein the suction device heads are made of a solid, non-flexible material, the net impact being the suction devices, in the aggregate, work to hold the pane of glass flat, avoiding the undulating bending characteristic at the locations of contact points of the respective suction devices with flexible lips.

2. The apparatus according to claim 1, wherein the respective suction device frames comprise transverse webs, said apparatus further comprising at least one of power suction devices, precision suction devices and grippers employed on the transverse webs of the suction device frames, the grippers being selected from the group consisting of ultrasonic grippers and electrostatic grippers.

3. The apparatus as claimed in claim 2, wherein the glass panels are coated, and wherein the grippers are used for repositioning purposes on the air side of the glass panels.

4. A method for repositioning glass panels of large surface area, wherein said panels can be held from the bath side or from the air side, comprising the following steps:
   capturing respective glass panels of about 40 meters in length and about 6 meters in width by means of a plurality of stacking robots extending over the entire length of the glass panels and each installed on robot basic frames, on the air side or on the bath side by means of pivotable suction device frames and suction devices which are fastened to said suction device frames and delivering the glass panels on conveying rollers of a transportation apparatus, wherein the conveying rollers run in two tracks which run in parallel and at a distance from each other, where the conveying rollers are driven individually, and wherein the horizontal distance of the individual conveying rollers in relation to one another can be varied,
   holding each respective glass panel flat through the work of the suction devices in the aggregate, wherein each individual suction device includes a sealing ring guided in a suction device head, the suction device head sliding together in a rubber bellows in a holding plate, wherein the suction device heads are made of a solid, non-flexible material, the net impact being that the suction devices work in unison to hold each respective pane of glass flat, avoiding the undulating bending characteristic at the locations of contact points of the respective suction devices with flexible lips,
   jointly pivoting each respective glass panel by said plurality of stacking robots and setting the respective glass panels down on a stacking shelf; and
   fitting the suction device frames with laser sensors for coordinating the position of adjacent suction device frames, and coordinating the position of the entire glass panel by the robot basic frames which each have light field sensors for coordinating the position of the entire glass panel.

5. The method as claimed in claim 4, wherein the suction device frames each have transverse webs, and the method further including the step of employing a selected one or both of power suction devices and precision suction devices on the transverse webs of the suction device frames.

6. The method as claimed in claim 4, wherein the glass panels are to be coated, and the method further using a selected one or both of electrostatic grippers and ultrasonic grippers for repositioning purposes on the air side for the glass panels to be coated.

7. The method as claimed in claim 4, and further including the step of using the stacking robots individually in a rapid mode of operation by direct pivoting.

8. The method as claimed in claim 4, and further including the step of using a suction device having at its center a circular filter element operative to keep fine glass particles away from an associated vacuum pump.

9. An apparatus for repositioning glass panels of large surface area and, wherein said panels can be held from the bath side or from the air side, the apparatus comprising:
   a transportation apparatus comprising conveying rollers, wherein the conveying rollers run in two tracks which run in parallel and at a distance from each other, the conveying rollers are driven individually, and wherein the horizontal distance of the individual conveying rollers in relation to one another can be varied;

a plurality of stacking robots arranged next to one another, wherein each stacking robot has two pivotable main arms, each main arm having a rotary joint connected in an articulated manner and having a synchronous drive, a robot arm connected to said rotary joint in an articulated manner and connected to a pivot head, and a suction device frame fastened to said robot arm, the stacking robots being installed on robot basic frames;

a plurality of suction devices supported on the suction device frame by transverse webs arranged in a structure resembling a rake; and a stacking framework on which a glass panel can be set down with the air side at the top or with the bath side at the top, wherein the suction device frames are fitted with laser sensors for coordinating the position of adjacent suction device frames such that each laser sensor is able to emit laser beams for the purpose of communication with a respectively adjacent suction device frame and also to receive laser beams of this kind as communication signals, so that said laser sensors can coordinate the control of the drives of the robot basic frames, each of the robot basic frames having light field sensors for coordinating the position of the entire glass panel, which light field sensors are able to contribute to superordinate data-related coordination of each of the individual suction devices over the entire region of the glass panel, wherein the laser sensors communicate diagonally to detect twisting of individual suction device frames to correct twisting using control means, and wherein each individual suction device includes a sealing ring guided in a suction device head, the suction device head sliding together in a rubber bellows in a holding plate, wherein the suction device heads are made of a solid, non-flexible material, the net impact being the suction devices, in the aggregate, work to hold the pane of glass flat, avoiding the undulating bending characteristic at the locations of contact points of the respective suction devices with flexible lips.

* * * * *

UNITED STATES PATENT AND TRADEMARK OFFICE
CERTIFICATE OF CORRECTION

PATENT NO. : 10,464,760 B2  
APPLICATION NO. : 14/434067  
DATED : November 5, 2019  
INVENTOR(S) : Christian Herfert Page 1 of 1

It is certified that error appears in the above-identified patent and that said Letters Patent is hereby corrected as shown below:

On the Title Page

At item (73) Assignee, the first line:
"Maschinebau" should read -- Maschinenbau --

At item (73) Assignee, the second line:
"Asbah-Baeumenheim (DE)" should read -- Asbach-Baeumenheim (DE) --

Signed and Sealed this
Fifth Day of May, 2020

Andrei Iancu
*Director of the United States Patent and Trademark Office*